Dec. 18, 1928.

T. N. HARRISON, JR 1,695,920

METALLIC MILK BOTTLE

Filed Feb. 25, 1926

Thomas N Harrison Jr.
Inventor
By Paul B Eaton
Attorney

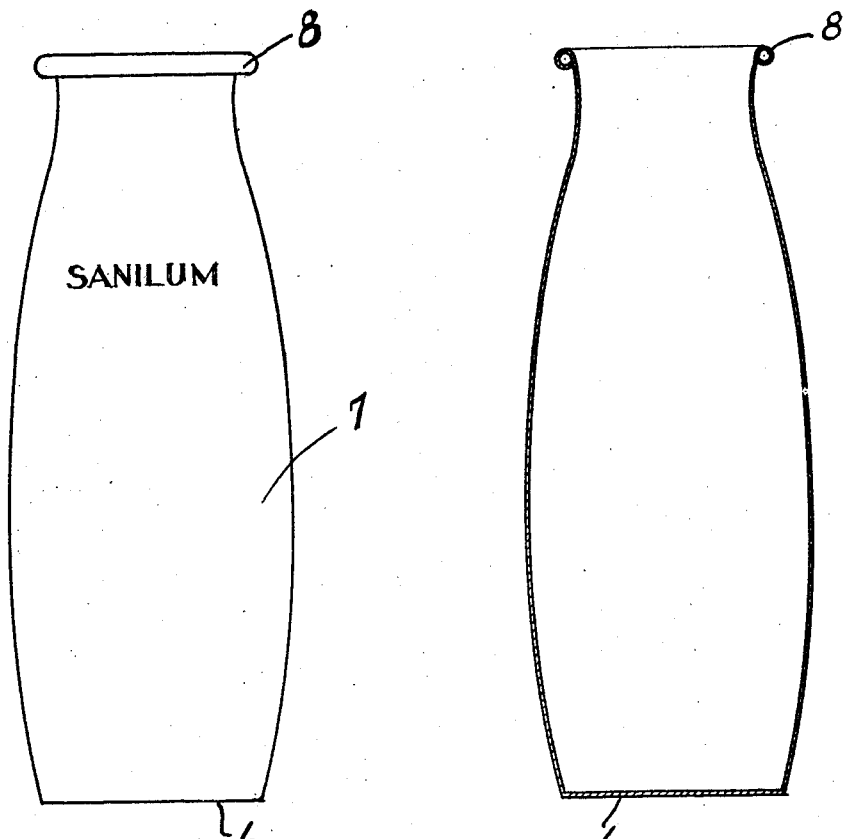

Patented Dec. 18, 1928.

1,695,920

UNITED STATES PATENT OFFICE.

THOMAS N. HARRISON, JR., OF LITTLETON, NORTH CAROLINA.

METALLIC MILK BOTTLE.

Application filed February 25, 1926. Serial No. 90,568.

My invention relates to metallic milk bottles, and more especially to an aluminum nursing bottle, which is seamless and has a rolled edge around the mouth.

An object of my invention is to provide a nursing bottle which will be sanitary, easily washed, and one which will not break easily. It is a well known fact that among the poorer families there are many times when a nursing bottle made of glass becomes broken, and the finances of the family will not permit the purchase of a new one. In such instances it is necessary that the child be fed from an ordinary glass or by other means. It is an object of my invention to provide a metallic nursing bottle, made preferably of aluminum, which is adapted to have a large rubber nipple fitted over the mouth thereof, said nursing bottle having a smooth interior to prevent the adhering of germs thereto, and having a highly polished outer surface, which will render the same pleasing in appearance and at the same time very serviceable.

Having thus stated some of the objects of my invention, other objects will appear as the description proceeds.

Some of the objects of invention having been stated, a brief description of the different figures in the drawings will follow, in which Figure 1 is a side elevation of my device;

Figure 3 is a side elevation of a modified form of my invention;

Figure 4 is a vertical sectional view of the modification shown in Figure 3.

The figures in the drawings having been briefly described, a detailed description of the drawings will now follow, in which like reference characters indicate corresponding parts throughout the drawings.

Figure 1:
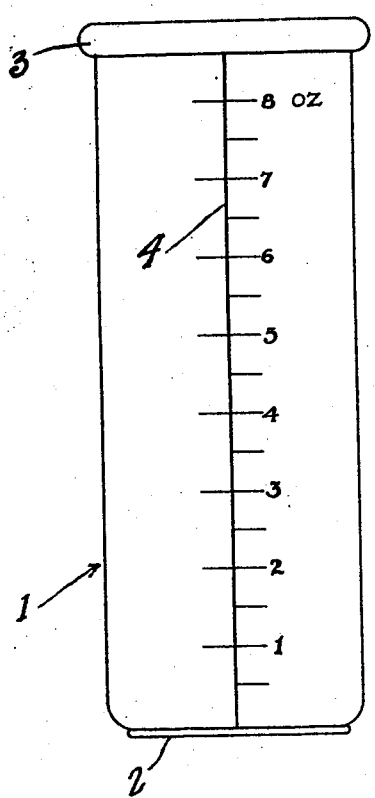

The numeral 1 indicates the side portions of my metallic milk bottle, while the reference character 2 designates the flat bottom thereto, the sides flaring outwardly and upwardly from the said bottom portion. The top of the bottle has a rolled edge 3, and a series of graduations 4 appear on the side of the bottle, the side and the entire exterior being highly polished to present a neat appearance and to add to the sanitary properties of the bottle. The bottle has a smooth interior 5.

Figure 2:
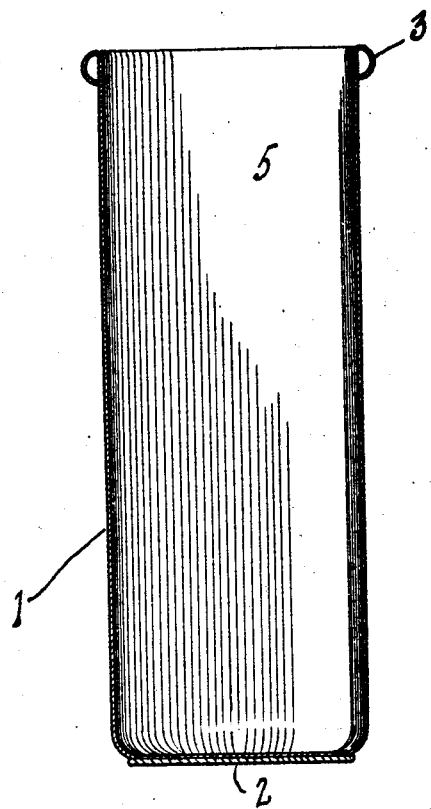
Figure 2 is a vertical sectional view of my metallic milk bottle.

A slight modification of my invention is shown in Figures 3 and 4, in which the bottom portion 6 is made in one piece with the sides 7. This modification also has the rolled lip 8 at its upper and open end, which is similar to the rolled lip 3 as shown in Figures 1 and 2. This modification shown in Figures 3 and 4 also has the highly polished exterior and the smooth interior.

It is seen that I have devised a one-piece, seamless, sanitary, unbreakable nursing bottle, and one which will fill a long felt need.

This bottle can be made by stamping the same out of aluminum stock or by molding the same, or by any desired method, and when made and polished will be more sanitary than any bottle heretofore known, in that it can be thrown into boiling water and thoroughly cleansed, while the ordinary glass bottle cannot receive such treatment without a great breakage loss.

Having thus fully described my invention, what I desire to protect and secure by Letters Patent of the United States is as follows:

A metallic nursing bottle having a flat base portion, said flat base portion having secured thereto a second supporting base portion, the wall portions of the bottle and the base portion being connected to each other by a gradual curve and being integral with each other, the upper end of the bottle having its edges rolled outwardly until the upper edges of the bottle fit snugly against the outer wall portion to form a sanitary and smooth edge for the mouth of the bottle.

In testimony that I claim the foregoing as my own, I have signed my name to this specification, this the 11th day of February, 1926.

THOMAS N. HARRISON, JR.